Aug. 10, 1937.                  M. SIGMUND                    2,089,583
              FLUID TIGHT WINDING FOR ELECTRIC MOTORS AND
                    METHOD FOR THE MANUFACTURE THEREOF
                           Filed June 1, 1934              2 Sheets-Sheet 1

Inventor:
Miroslav Sigmund
By
Attorney.

Aug. 10, 1937.  M. SIGMUND  2,089,583
FLUID TIGHT WINDING FOR ELECTRIC MOTORS AND
METHOD FOR THE MANUFACTURE THEREOF
Filed June 1, 1934  2 Sheets-Sheet 2
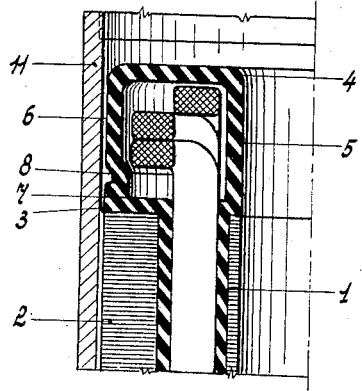
Fig. 4
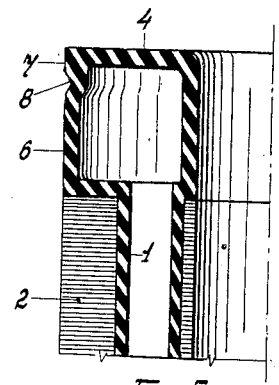
Fig. 5
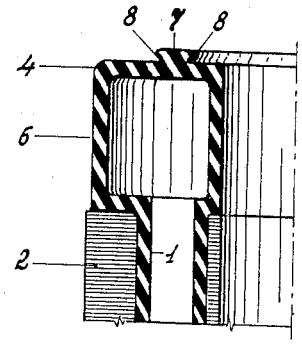
Fig. 6
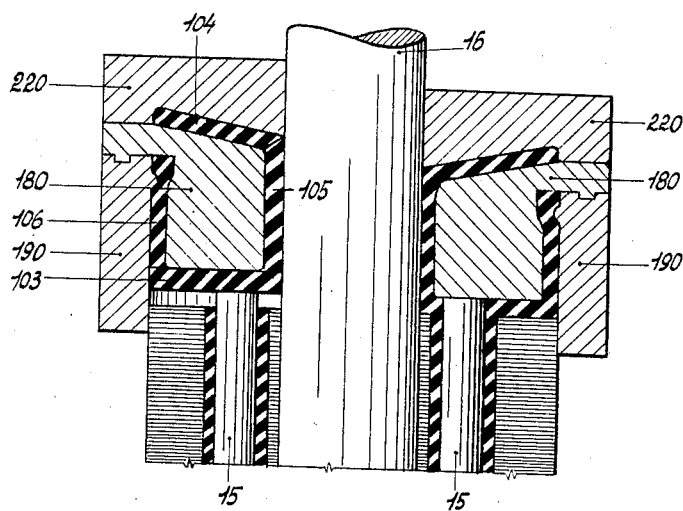
Fig. 7
Inventor:
Miroslav Sigmund
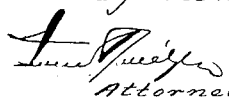
Attorney Patented Aug. 10, 1937

2,089,583

UNITED STATES PATENT OFFICE 2,089,583

FLUID-TIGHT WINDING FOR ELECTRIC MOTORS AND METHOD FOR THE MANUFACTURE THEREOF

Miroslav Sigmund, Lutin, near Olomouc, Czechoslovakia

Application June 1, 1934, Serial No. 728,616
In Czechoslovakia June 7, 1933

9 Claims. (Cl. 171—252)

The object of the invention is to provide a fluid-tight winding for electric motors, the rotors and stators of which can work under water.

The invention relates to electric motors in which the stator winding is directly protected by means of a special winding envelope, constructed in the form of a fluid-tight unit, from contact with the fluid.

Heretofore, electric motors have been known, in which the fluid-tight envelope of the stator winding consists of a rubber cage constituted by tubes mounted in the stator slots and also by open trough chambers, disposed on the ends of the stator, into which chambers the tubes open in a fluid-tight manner. After the insertion of the winding into the said envelope, the walls of the trough chambers are bent across the winding ends and are united together in a fluid-tight manner, the envelope being thereby closed. Such overlapping of the chamber walls results in a deformation of the said walls and a stretching of the material thereof which causes considerable difficulties when uniting the edges of the walls to form a unit, and in addition may cause the wall of the envelope to become porous.

The configuration and method of production according to the invention simplify the manufacture of the envelope and the closing thereof in a fluid-tight manner, and also render it possible to test the envelope for tightness in a simple manner before the insertion of the winding.

According to the invention, the winding envelope is so shaped that the end chambers, in which the ends of the winding coils are situated, are constituted by closed annular chambers with a division joint in one of the chamber walls, the said division joint rendering it possible to open the chamber and bend over the chamber walls, so as to expose the space above the slot tubes and render possible the winding of the stator. After the stator has been wound or after the insertion of the winding into its envelope, the chamber walls are bent back into the original position and are joined together. The closing of the envelope is not accompanied by any powerful deformation of its walls, this having the favourable effect of an increased fluid-tightness and life of the envelope, and in addition renders possible an easier and reliable joining of the edges of the walls thereof, because the said walls themselves have a tendency to approach each other.

The edges of the end chamber walls are united together either mechanically by detachable means which press the contact surfaces of the division joint against each other, or permanently, without the aid of external, detachable mechanical means, by sticking together or vulcanization. The last-mentioned, non-detachable union results in a smaller diameter of the motor casing and also enables the division joint of the chamber to be positioned at such places of the said chamber that the deformation of the chamber, when the latter is opened and its walls are bent upwardly for exposing the space necessary for winding the stator, is substantially diminished.

The manufacturing operation or the provision of the winding envelope is carried out entirely on the assembled motor. The envelope is made by moulding and vulcanizing raw rubber or any other suitable material. First of all, the rubber tubes in common with corresponding mandrels are inserted into the slots, annular rubber discs are placed on the said mandrels, whereupon by means of suitable dies and counter-dies, a central mandrel and suitably shaped plates or rings of rubber the remaining portion of the mould for moulding the end chambers is assembled. Finally, by the application of pressure and suitable heat, the envelope is given the desired shape and is vulcanized. Simultaneously therewith is effected the moulding of the projections necessary on the envelope for subsequent control work and the like, and the projection for the lead-in cable which is moulded at the same time in the said projection, so that the provision of a terminal box is rendered quite unnecessary.

Several constructional examples of the envelope according to the invention, and the new method of manufacture and winding are shown in the accompanying drawings, in which:—

Figures 4, 5, and 6 show longitudinal sections of different forms of construction of a winding envelope with chambers, in which the walls are connected permanently.

Figure 7 shows the method of making an envelope according to Figure 5, the left-hand side of the figure showing the assembled mould before vulcanizing, while the right-hand half of the figure shows the assembled mould after vulcanizing.

Figure 1:
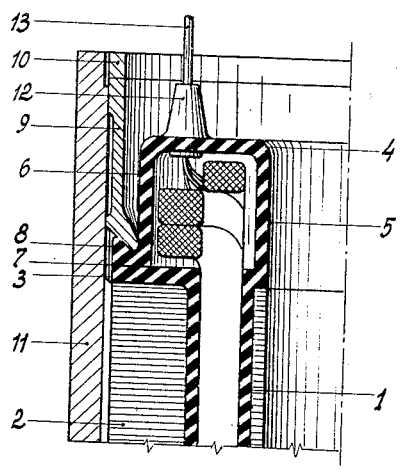
Figure 1 shows a part section through the motor and its winding with an envelope, in which the chambers are closed mechanically by detachable auxiliary means.

According to Figure 1, the fluid-tight envelope comprises tubes 1, which are placed in the slots of the stator 2 and are connected at the stator ends with annular chambers 3. The said chambers are entirely closed and in their cylindrical outer wall 6 are provided with a division joint 7 which renders it possible to open the chamber and turn its walls 4 and 6 upwardly in order to be able to insert the winding into the envelope. The joint 7 is provided on the lower edge of the cylindrical wall 6 in the plane of the inner boundary face of the wall 3. The contact surfaces of the joint 7 are widened outwardly into the form of flanges, and in the flange of the wall 5 is a depression 8 for the pressing member 9, by means of which the wall 6 is pressed against the wall 3 in a fluid-tight manner. The member 9 is applied for example by means of a nut 10 screwed into the wall 11 of the motor casing.

Figure 2:
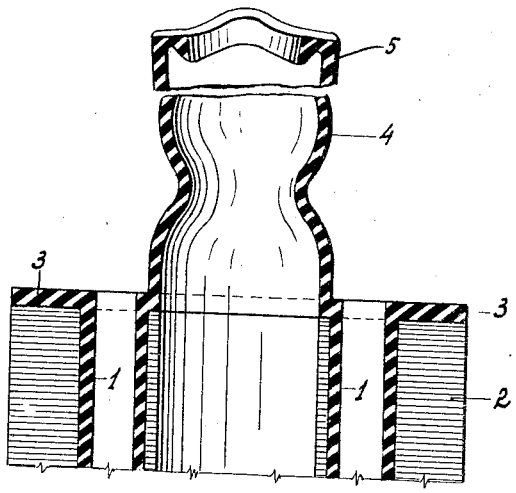
Figure 2 is a part section through the stator with a winding envelope, in which the chamber is opened and turned up so that the envelope is prepared for winding.

After preparing the envelope in the manner to be described hereinafter, the contact surfaces of the joint 7 are temporarily pressed upon each other and the envelope is tested for tightness by means of compressed air. Thereupon, the chambers are opened in the manner shown in Figure 2 and the winding is inserted. The chambers are then turned back into their original position and are definitely closed in the manner already described by pressing the contact surfaces of the joint 7 together in a fluid-tight manner.

According to the invention, the lead-in cable is connected to the winding envelope in such a manner that its insulation envelope forms a whole with the winding envelope. For this purpose, a projection 12 is provided on one of the end chambers, and the lead-in cable 13 is vulcanized into the said projection simultaneously with the manufacture of the envelope, so that the rubber envelope of the said cable unites with the winding envelope in an impermeable manner.

Figure 3:
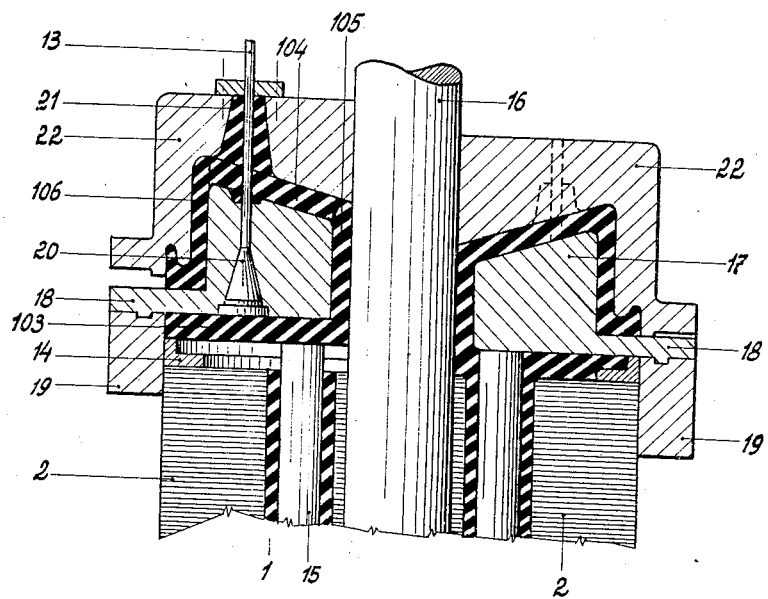
Figure 3 shows in the left-hand half a part section through the stator and the mould before the commencement of moulding the envelope, while the right-hand half shows the mould in its position after moulding of the envelope has taken place.

The winding envelope is made directly on the stator by moulding or pressing and vulcanizing from raw rubber or a like suitable material. This manufacturing process is indicated diagrammatically in Figure 3 in two stages of manufacture. Tubes 1 of raw or semi-vulcanized rubber of a length corresponding to the length of the stator are first inserted into the stator packet 2 bound together by rings 14. Mandrels 15 of such a length that they project from the stator packet at either end by the wall thickness of the subsequent end chambers are inserted into the tubes 1. Annular plates 103 are now placed on the projecting ends of the mandrels 15 and at the same time the mandrel 16, forming the inner profile of the end chambers, is inserted into the stator bore. The rubber ring 105, from which the wall 5 of the end chamber is to be moulded, is then placed over the mandrel 16 until it bears against the flange 103, and thereupon the die 17, the surface of which corresponds to the shape of the inner cross-section of the end chambers, is placed on the plates 103. This die is connected by means of an edge flange 18 to a centering ring 19 carried on the stator periphery. The flange 18 forms a partition between the wall 3 and the outer wall 6 of the chamber, the joint 7 being thereby produced. The die 17 is at the same time so constructed that it is possible to comprise with it the lead-in cable which, during the moulding of the winding envelope, is to be united to the latter at the same time. This problem is in this case solved for example by providing the die with a conical bore 20 which passes over into a bore corresponding to the cable diameter and starts from the underside of the die. Before the die 17 is placed upon the stator, the cable 13 is threaded through the bore 20 and its end is thickened by hammering out and winding with rubber or the like in such a manner that it is impossible to withdraw the said cable during the pressing operation. In order to obtain a perfectly reliable securing of the cable in the chamber, a projection 21 is provided on the upper wall of the chamber in the extension of the cable, the said projection increasing the surface of the contact between the cable and the wall of the chamber. The said projection 21 is moulded by means of the cavity 21 in the counter-die 22.

An annular rubber plate 104 is now placed on the die 17 and the rubber plate 106, which is suitably thickened at the position of the subsequent joint 7, is placed round the periphery of the die, whereupon the counter-die 22 is placed on, the moulding cavities of the said counter-die being filled with rubber for forming the necessary projections, if required with the simultaneous insertion of appropriate mandrels. All rubber plates and the other mould elements are of such dimensions that, after pressing, the cavities of the mould are completely filled and a homogeneous and compact work-piece is produced. The individual rubber components may also be partly pre-moulded in order to facilitate assembling of the mould.

The whole is thereupon placed under pressure and at the same time gradually heated. The superfluous material is thereby squeezed out through the joints between the individual parts of the mould, while the remaining material is compacted to form an impermeable mass of rubber, and at the same time all the rubber parts are united to form a homogeneous whole.

For the purpose of simplifying the assembling and dismantling the mould, the die and counter-die are made in two parts.

In order that tubes 1 in the stator slots, during the manufacture of the envelope, shall not be pressed between the stator stampings, thereby in the event of the thermal expansion of the stator possibly giving rise to the formation of cracks in the tubes, which cracks would cause leakiness of the envelope, it is advisable, before inserting the tubes into the slots, to provide the said tubes with a covering of linen or to line the slots with inserts of pressboard.

Figures 4, 5, and 6 show a form of construction of the envelope, in which the contact surfaces of the division joint, after winding the stator, are united permanently without the aid of external, detachable mechanical means, namely, by sticking together or vulcanization. A smaller diameter of the motor casing is thereby obtained and also it is possible to position the division joint of the chamber at such places in the latter that the deformation of the chamber, when it is opened and its walls are turned upwardly for exposing the space necessary for winding the stator, is substantially diminished.

The division joint 7 may indeed be provided at any desired place, but it is preferably constructed on the lower or upper edge of the cylindrical external wall 6 of the envelope or in the upper end wall 4. The construction according to Figure 5, in which the turning upwardly of the chamber walls can be effected most easily, has been found to be most advantageous. A depression or depressions 8 are provided in the vicinity of the external edge of the joint 7 for permitting the contact surfaces of the joint 7 to be clamped together by detachable, mechanical compressing means in order to be able to close the envelope temporarily for the purpose of testing it for impermeability before introducing the winding or after introducing the winding for the purpose of permanently uniting the envelope in the joint.

The envelope is manufactured by the moulding and vulcanizing of rubber in the manner described hereinbefore by means of a central mandrel 16, mandrel 15 inserted in the slots and the mould elements 220, 180, 190.

After manufacture, the envelope is tested for impermeability, the joint being temporarily closed by means of detachable mechanical auxiliary means, and thereupon the chambers are opened and winding is carried out. The chambers are then brought into their original closed condition again and the joint 7 is united. This is effected by sticking or vulcanizing, the joint or its contact surfaces being united by the insertion of a thin strip of raw rubber, whereupon the contact surfaces suitably prepared for a reliable sticking together of the joint, are pressed together under high pressure and are vulcanized by the action of heat. A one-piece, fluid-tight envelope, in which the winding is inaccessibly closed, is thereby provided.

The union of the contact surfaces of the joint may be effected not merely by vulcanization, but it may be carried out by adhesion with the aid of a suitable adhesive, which is capable of providing a firm, homogeneous and impermeable union.

Of course, the invention is not restricted to the constructional example shown, but on the contrary it comprises the solution indicated hereinbefore, which allows of various modifications of detail without departing from the scope of the invention.

I claim:—

1. A method for producing a fluid-tight winding for electric motors, comprising inserting tubes of insulating material and corresponding mandrels into slots in the stator of the motor, pressing end chambers provided in one wall with a division joint onto the stator by means of dies and counter-dies and at the same time uniting the end chambers and the tubes, and vulcanizing the envelope so formed, exposing the space above the tubes and enclosed by the end chambers, threading wires through the slots to form the winding, making end connections within the chambers, closing the end chambers, and sealing said chambers into a fluid-tight manner.

2. A method for producing a fluid-tight winding for electric motors, comprising inserting tubes of rubber and corresponding mandrels into slots in the stator of the motor, said mandrels extending beyond the ends of the stator, inserting into the central bore of the stator a mandrel and then placing successively on the ends of said mandrel, annular rubber plates, rubber sleeves, die members, further annular rubber plates and sleeve portions and finally a counter-die, subjecting the assembly to heat and pressure to form end chambers and to unite simultaneously the tubes and end chambers to form a fluid-tight envelope, exposing the space above the tubes and enclosed by the end chambers, threading wires through the slots to form the winding, making end connections within the chambers, closing the end chambers, and sealing said chambers in a fluid-tight manner.

3. A method for producing a fluid-tight winding for electric motors, comprising partly preforming individual rubber pieces of the envelope to be formed, inserting tubes of rubber and corresponding mandrels into slots in the stator of the motor, said mandrels extending beyond the ends of the stator, inserting into the central bore of the stator a mandrel and then placing successively on the ends of said mandrel, annular rubber plates, rubber sleeves, die members, further annular rubber plates and sleeve portions and finally a counter-die, subjecting the assembly to heat and pressure to form end chambers and to unite simultaneously the tubes and end chambers to form a fluid-tight envelope, exposing the space above the tubes and enclosed by the end chambers, threading wires through the slots to form the winding, making end connections within the chambers, closing the end chambers, and sealing said chambers in a fluid-tight manner.

4. A method for producing a fluid-tight winding for electric motors, comprising inserting tubes of insulating material and corresponding mandrels into slots in the stator of the motor, pressing end chambers provided in one wall with a division joint onto the stator by means of dies and counter-dies and at the same time uniting the end chambers and the tubes, and vulcanizing the envelope so formed, exposing the space above the tubes and enclosed by the end chambers, threading wires through the slots to form the winding, making end connections within the chambers, closing the end chambers, and sealing said chambers in a fluid-tight manner by permanently uniting the contact surfaces of the division joint by sticking together.

5. A method for producing a fluid-tight winding for electric motors, comprising inserting tubes of insulating material and corresponding mandrels into slots in the stator of the motor, pressing end chambers provided in one wall with a division joint onto the stator by means of dies and counter-dies and at the same time uniting the end chambers and the tubes, and vulcanizing the envelope so formed, exposing the space above the tubes and enclosed by the end chambers, threading wires through the slots to form the winding, making end connections within the chambers, closing the end chambers, inserting between the contact surfaces of the division joint a strip of raw or partly vulcanized rubber, and sealing said chambers in a fluid-tight manner by permanently uniting together the contact surfaces of the division joint by vulcanization.

6. A fluid-tight winding for electric motors, comprising tubes inserted into stator slots, and annular end chambers connected to and forming a unitary structure with said tubes to provide a fluid-tight envelope for the wires of the stator winding, the chambers each having a division joint in one wall whereby the end chambers may be opened to expose the ends of the tubes and the walls of the end chambers being normally in the unstressed condition.

7. A fluid-tight winding for electric motors, comprising tubes inserted into stator slots, annular end chambers connected to and forming a unitary structure with said tubes to provide a fluid-tight envelope for the wires of the stator winding, the chambers each having a division joint in one wall whereby the end chambers may be opened to expose the ends of the tubes and the walls of the end chambers being normally in the unstressed condition, and mechanical means pressing the contracting surfaces of the division joint into engagement.

8. A fluid-tight winding for electric motors, comprising tubes inserted into stator slots, annular end chambers connected to and forming a unitary structure with said tubes to provide a fluid-tight envelope for the wires of the stator winding, the chambers each having a division joint in one wall whereby the end chambers may be opened to expose the ends of the tubes, the walls of the chambers being normally in the unstressed condition, the wall including the division joint being thickened adjacent the joint to provide large contacting surfaces, and means engaging the thickened portions and pressing said contacting surfaces in engagement.

9. A method for producing a fluid-tight winding for electric motors, comprising inserting tubes of insulating material and corresponding mandrels into slots in the stator of the motor, pressing end chambers provided in one wall with a division joint onto the stator by means of dies and counter-dies and at the same time uniting the end chambers and the tubes, and vulcanizing the envelope so formed, exposing the space above the tubes and enclosed by the end chambers, threading wires through the slots to form the winding, making end connections within the chambers, closing the end chambers, and sealing said chambers in a fluid-tight manner by mechanically pressing together the contact surfaces of the division joint.

MIROSLAV SIGMUND.